(12) United States Patent
Xu et al.

(10) Patent No.: US 8,424,933 B2
(45) Date of Patent: Apr. 23, 2013

(54) LOCKING DEVICE AND ELECTRONIC ENCLOSURE USING SAME

(75) Inventors: Chang-Zheng Xu, Shenzhen (CN); Yang-Ming Lin, Shenzhen (CN); Hsuan-Tsung Chen, Taipei Hsien (TW); Guang-Yao Lee, Taipei Hsien (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 456 days.

(21) Appl. No.: 12/688,901

(22) Filed: Jan. 17, 2010

(65) Prior Publication Data
US 2011/0115348 A1 May 19, 2011

(30) Foreign Application Priority Data
Nov. 19, 2009 (CN) .......................... 2009 1 0309991

(51) Int. Cl.
*E05C 1/08* (2006.01)
*E05C 1/02* (2006.01)

(52) U.S. Cl.
USPC ..... 292/163; 292/137; 292/164; 292/DIG. 63

(58) Field of Classification Search .................. 292/156, 292/128, 102, 106, 108, 175, 146, 150, 153, 292/137, 163, 164, 177, 179, DIG. 63; 361/681, 361/727, 679.27, 697.58, 726
See application file for complete search history.

(56) References Cited

U.S. PATENT DOCUMENTS

| | | | | |
|---|---|---|---|---|
| 1,526,066 A * | 2/1925 | Hornostaj | ...................... | 292/150 |
| 1,908,388 A * | 5/1933 | Watson | ......................... | 292/164 |
| 2,361,186 A * | 10/1944 | Fishbein et al. | ............. | 160/369 |
| 3,183,030 A * | 5/1965 | Schlueter | ...................... | 292/303 |
| 4,526,412 A * | 7/1985 | Gist | ............... | 292/258 |
| 4,964,661 A * | 10/1990 | Cadwell et al. | .................. | 292/87 |
| 5,158,329 A * | 10/1992 | Schlack | ......................... | 292/87 |
| 5,289,347 A * | 2/1994 | McCarthy et al. | ............. | 361/809 |
| 5,465,191 A * | 11/1995 | Nomura et al. | .......... | 361/679.27 |
| 5,497,296 A * | 3/1996 | Satou et al. | ............. | 361/679.09 |
| 5,513,069 A * | 4/1996 | Ohgami et al. | .......... | 361/679.39 |
| 5,647,618 A * | 7/1997 | Lamberth | ....................... | 292/19 |
| 5,769,437 A * | 6/1998 | Gasperino | .................. | 280/47.27 |
| 6,017,226 A * | 1/2000 | Jeffries et al. | ................... | 439/92 |
| 6,047,999 A * | 4/2000 | Dixon, Jr. | ...................... | 292/42 |
| 6,354,680 B1 * | 3/2002 | Lin et al. | .................... | 312/223.2 |
| 6,362,975 B1 * | 3/2002 | Liu et al. | ....................... | 361/796 |
| 6,381,145 B1 * | 4/2002 | Chen et al. | ................... | 361/752 |
| 6,535,380 B1 * | 3/2003 | Lee et al. | .................... | 361/679.27 |
| 6,721,183 B1 * | 4/2004 | Chen et al. | .................... | 361/726 |
| 6,729,664 B1 * | 5/2004 | Marsh et al. | .................. | 292/280 |
| 6,917,518 B2 * | 7/2005 | Chen | ............................ | 361/724 |

(Continued)

*Primary Examiner* — Carlos Lugo
(74) *Attorney, Agent, or Firm* — Altis Law Group, Inc.

(57) ABSTRACT

A locking enclosure includes a base, a cover mounted on the base, and two locking members assembled on the cover. A plurality of supporting recesses and two supporting portions are defined in the base. A plurality of barbs are formed on the cover to match with the supporting recesses, and two elastic arms are assembled on the cover to engage with the supporting portions, whereby the cover is restricted to move relative to the base, and is secured on the base. The locking members each comprise a resisting portion abutting a corresponding elastic arm. The resisting portion can be operated to make the elastic arm disengage from the supporting portion, to remove the cover from the base.

17 Claims, 7 Drawing Sheets

U.S. PATENT DOCUMENTS

| | | | |
|---|---|---|---|
| 6,935,661 B1 * | 8/2005 | Farnsworth et al. | 292/162 |
| 7,374,438 B2 * | 5/2008 | Jiang et al. | 439/135 |
| 7,417,851 B2 * | 8/2008 | Chen et al. | 361/679.27 |
| 7,789,437 B2 * | 9/2010 | Sheng | 292/137 |
| 7,810,855 B2 * | 10/2010 | Wing | 292/302 |
| 2004/0233630 A1 * | 11/2004 | Imamura | 361/686 |
| 2007/0228741 A1 * | 10/2007 | Park et al. | 292/163 |
| 2009/0323291 A1 * | 12/2009 | Dong | 361/726 |

\* cited by examiner

LOCKING DEVICE AND ELECTRONIC ENCLOSURE USING SAME

BACKGROUND

1. Technical Field

The present disclosure relates to locking devices, and particularly to a locking device for an electronic enclosure.

2. Description of Related Art

Usually, an enclosure of an electronic device such as a computer housing or a monitor, includes a base and a cover covering the base. Users can assemble electronic elements such as a main board onto the base and apply the cover to seal the enclosure, protecting the electronic elements.

Conventionally, a plurality of screws are applied to lock the cover onto the base. However, such means needs additional tools such as screwdrivers during assembly, which is time consuming and troublesome.

Therefore, there is room for improvement within the art.

DETAILED DESCRIPTION

The locking device for an electronic enclosure in accordance with an exemplary embodiment of the present disclosure is applied to a monitor as an example. Understandably, the locking device can be used in computer housings or other electronic devices.

Figure 6:
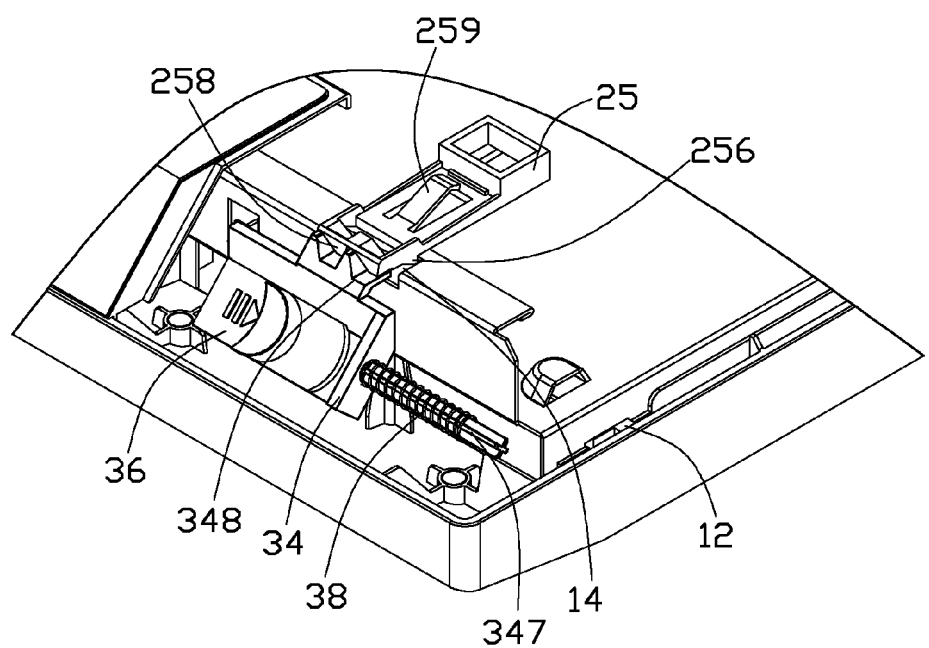
FIG. 6 is an isometric view of the monitor with the locking member in a locked position, wherein the cover has been removed for clarity.
Figure 7:
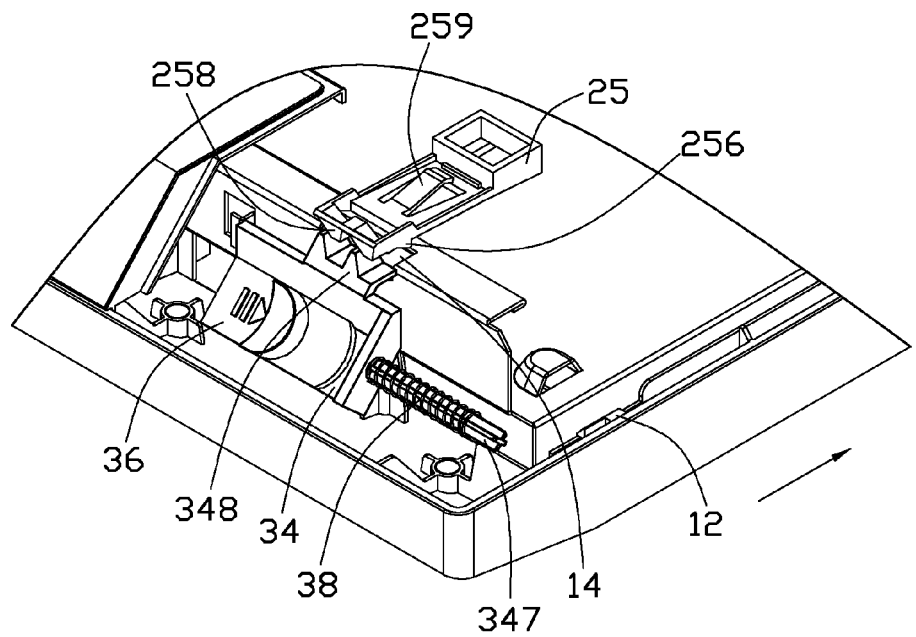
FIG. 7 is an isometric view of the monitor with the locking member in an unlocked position, wherein the cover has been removed for clarity.

Referring to FIGS. 1-3, and 6-7, the monitor comprises a base 10, a cover 20 mounted on the base 10, and two locking members 30 assembled on the cover 20. A plurality of supporting recesses 12 and two supporting portions 14 are defined in the base 10. A plurality of barbs 22 are formed on the cover 20 to match with the supporting recesses 12, and two elastic arms 25 are assembled on the cover 20 to engage with the supporting portions 14, whereby the cover 20 is restricted to move relative to the base 10, and is secured on the base 10 as shown in FIG. 6. The locking members 30 each comprise a resisting portion 34 abutting a corresponding elastic arm 25. The resisting portions 34 can be operated to make the elastic arms 25 disengage from the supporting portions 14, to thereby remove the cover 20 from the base 10, as shown in FIG. 7. There are two each of the locking members 30 and the elastic arms 25 in the present exemplary embodiment, and the locking members 30 and elastic arms 25 are symmetrically set in the front end of the cover 20. It is understood that, the numbers of locking members 30 can be changed in alternative embodiments, and just one locking member 30 matching with one elastic arm 25 is also capable of locking the cover 20 with the base 10.

Figure 1:
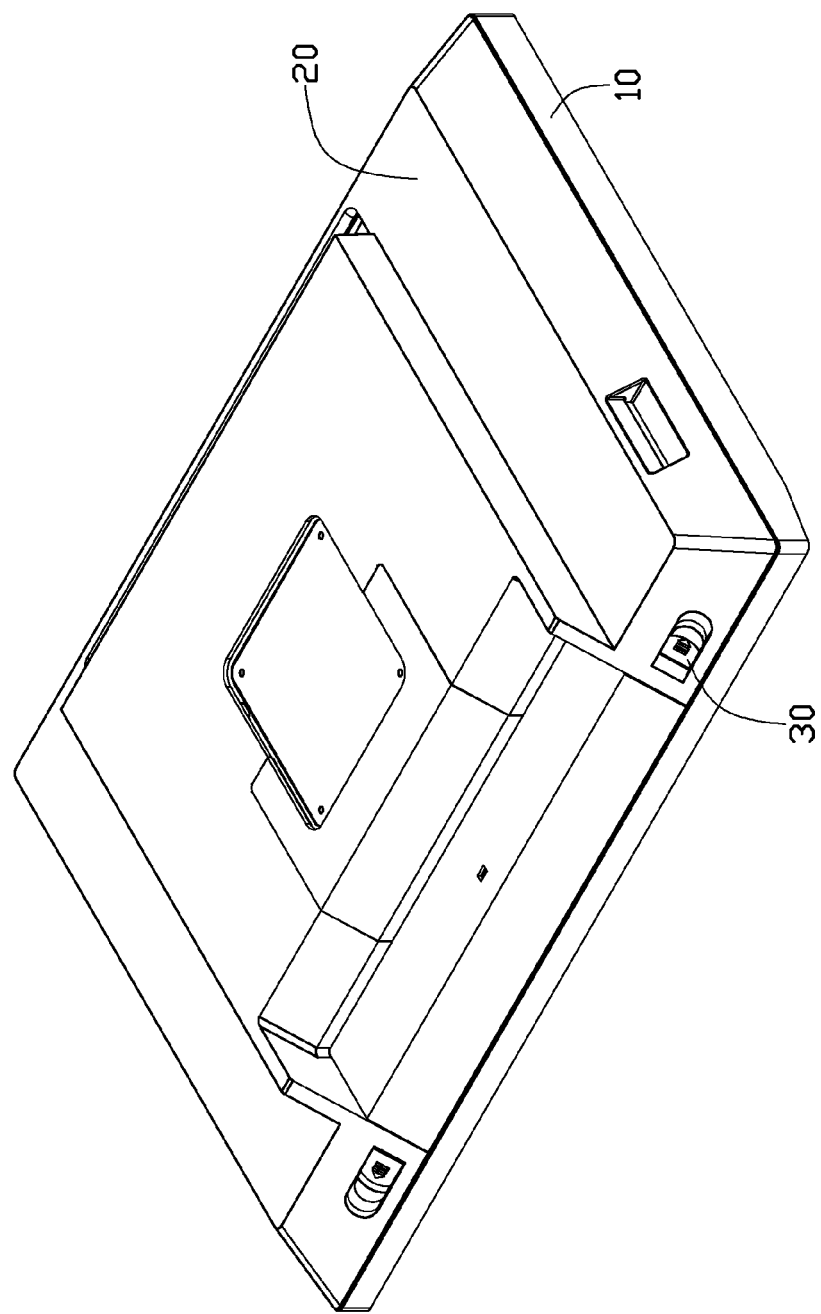
FIG. 1 is an isometric view of a locking device in accordance with an exemplary embodiment of the disclosure applied in a monitor.
Figure 2:
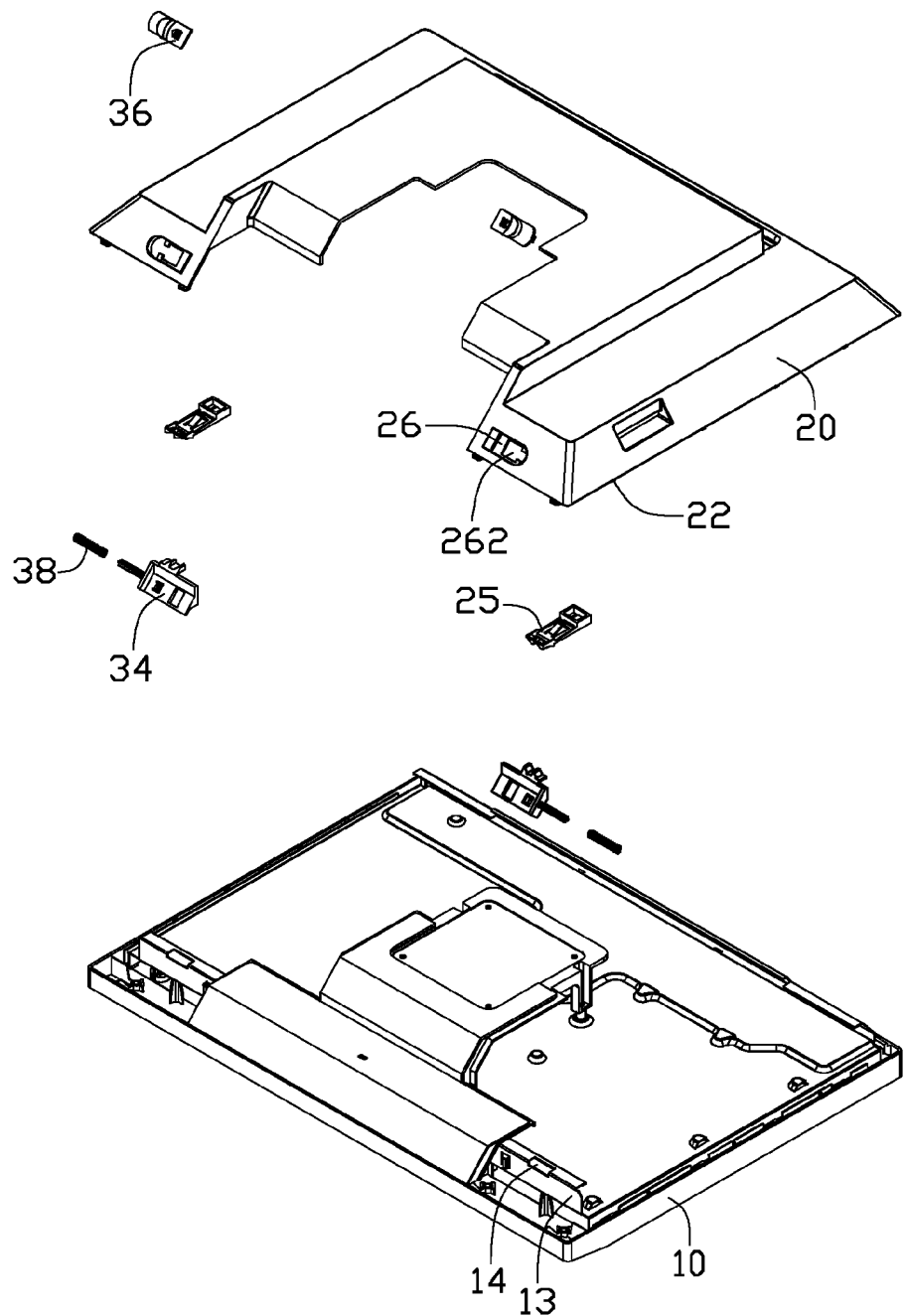
FIG. 2 is an exploded, isometric view of the locking device of FIG. 1.
Figure 3:
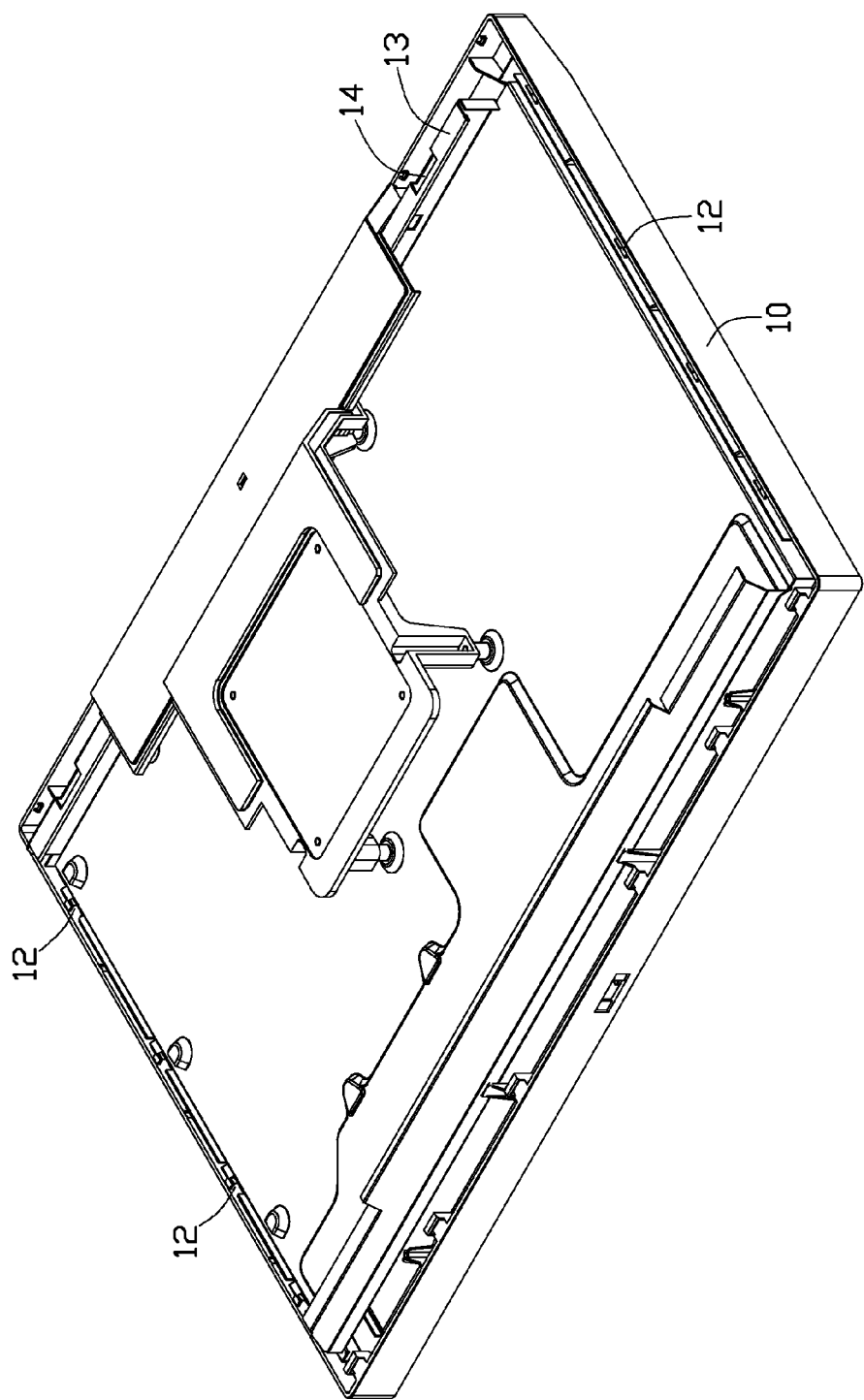
FIG. 3 is an isometric view of a base of the monitor in FIG. 2, shown from a different aspect.

As shown in FIGS. 2 and 3, a baffle 13 extends upwardly from the base 10 corresponding to the position of each locking member 30. In this embodiment, the supporting portion 14 is a slot defined in the baffle 13. The supporting recesses 12 are defined in two lateral sides of the base 10, herein are four in each lateral side. The opening direction of the supporting recesses 12 are opposite to the supporting portion 14.

Figure 4:
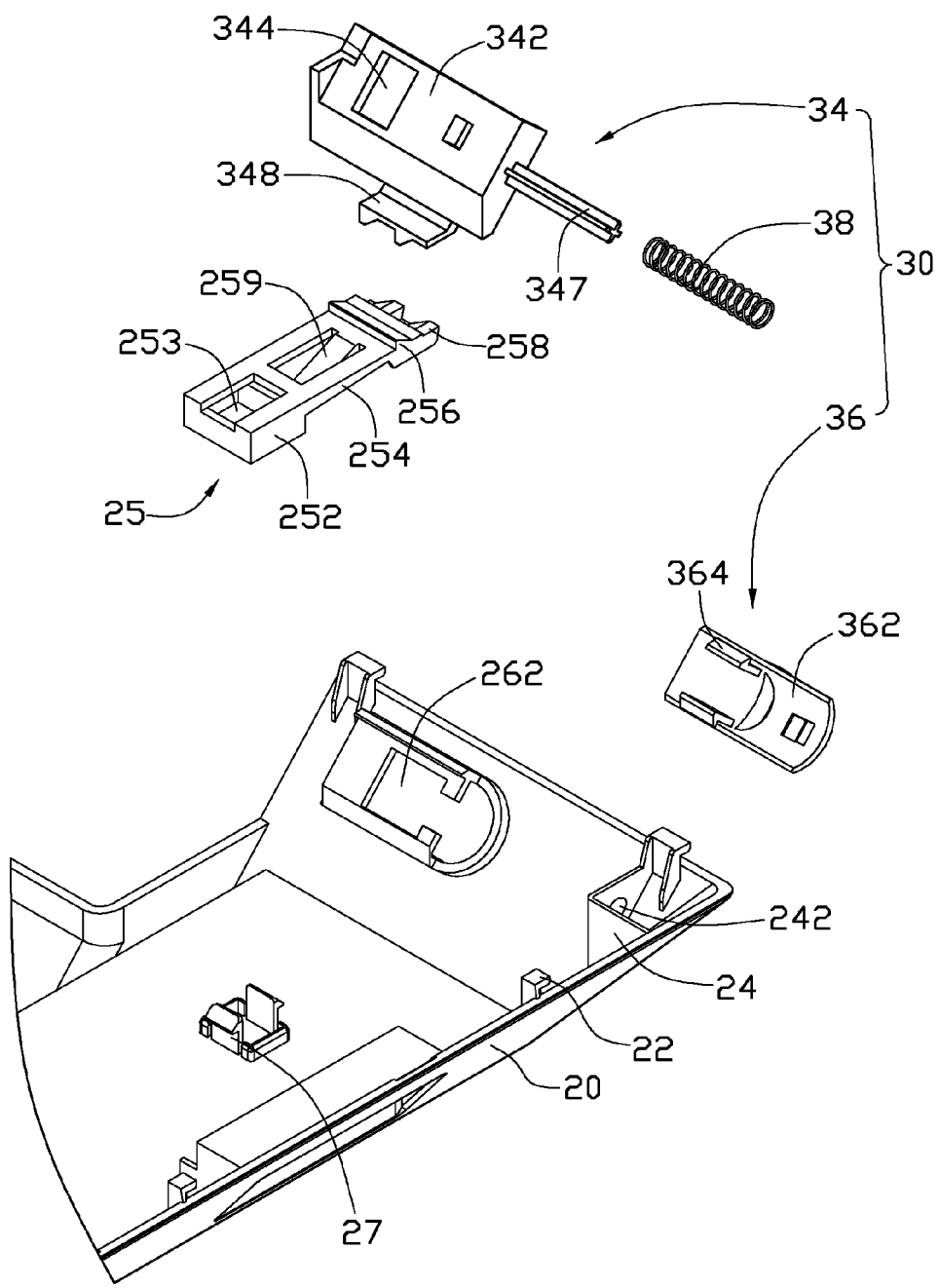
FIG. 4 is an exploded, isometric view of a locking member and a cover of the monitor in FIG. 2, shown from a different aspect.

Also referring to FIGS. 2 and 4, four barbs 22 extend down from each lateral side of the cover 20 for matching with the supporting recesses 12 of the base 10. A restricting wall 24 is formed at a bottom of the cover 20 and in each corner of the front end of the cover 20 with a hole 242 defined therein. A concave portion 26 is defined in the front end of the cover 20 corresponding to the position of each locking member 30. A notch 262 is defined in the concave portion 26. A pair of hooks 27 extend down from the bottom of the cover 20 corresponding to the position of each supporting portion 14 for engaging with a corresponding elastic arm 25. The elastic arm 25 is made from flexible material and is generally uniformly spaced from the cover 20 except where it is connected by a fixed end 252 to the cover 20 and further includes an engaging end 254 extending from the fixed end 252. A rectangular clasp hole 253 is defined through the fixed end 252 for the pair of hooks 27 extending in to secure the elastic arm 25 onto the cover 20. The engaging end 254 can be elastically deformed towards the cover 20 under stress. A claw 256 extends down from a distal end of the engaging end 254 opposite to the cover 20, i.e., towards the base 10, for engaging with the supporting portion 14 of the base 10. A first toothed portion 258 extends horizontally from the distal end of the engaging end 254 and herein is composed of two teeth. A flexible sheet 259 extends upwardly from the middle of the engaging end 254 towards the cover 20. The flexible sheet 259 abuts the bottom of the cover 20 and insures the engaging end 254 resumes its original shape and engages with the supporting portion 14 of the base 10, after a stress thereon is removed.

Figure 5:
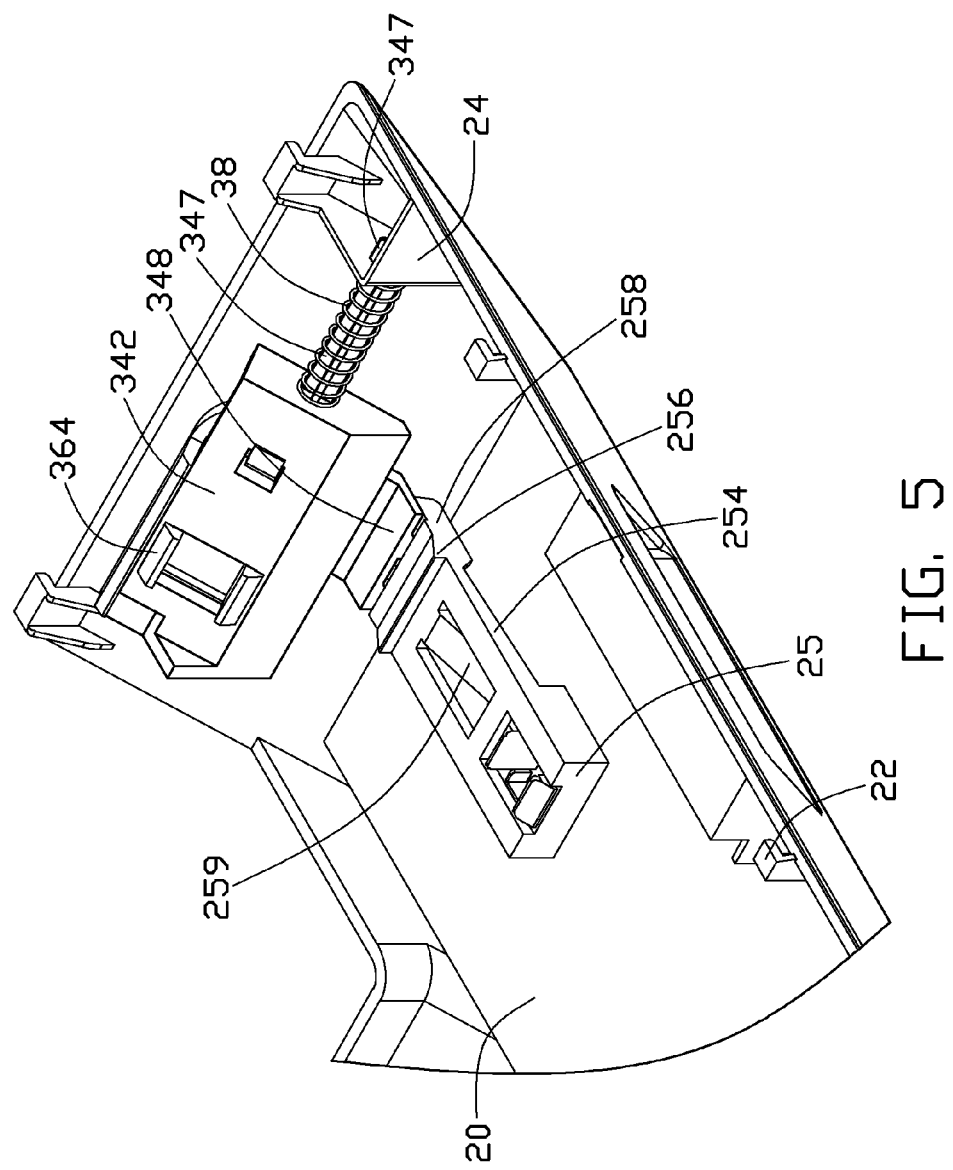
FIG. 5 is an assembled, isometric view of the locking member and the cover in FIG. 4.

Also referring to FIGS. 4-5, each locking member 30 comprises the resisting portion 34 assembled to the bottom of the cover 20, an operation portion 36 mounted on a top of the cover 20 and extended through the cover 20 to connect to the resisting portion 34, and a flexible member 38 abutting between the resisting portion 34 and the cover 20.

The resisting portion 34 comprises a substantially rectangular body 342, a connecting bar 347 extending from a lateral side of the body 342, and a second toothed portion 348 extending from an end of the body 342. A free end of the connecting bar 347 enters into the hole 242 of the restricting wall 24 of the cover 20. The second toothed portion 348 also composed of two teeth engages with the first toothed portion 258 of the elastic arm 25. A securing opening 344 is defined in the body 342.

The operation portion 36 comprises a flat handle 362 and two hooks 364 extending down from the handle 362. The handle 362 is received in the concave portion 26 of the cover 20, and the hooks 364 extend through the notch 262 of the cover 20 and engage in the securing opening 344 of the resisting portion 34 to connect to the resisting portion 34 and the operation portion 36. The first toothed portion 258 of the elastic arm 25 can be pushed by the second toothed portion 348 of the resisting portion 34 when the operation portion 36 is moved towards the restricting wall 24, to thereby make the engaging end 254 of the elastic arm 25 elastically deform towards the cover 20 and disengage the claw 256 of the engaging end 254 from the supporting portion 14 of the base 10.

The flexible member 38 is a spring in this embodiment and mounted on the connecting bar 347 of the resisting portion 34. The flexible member 38 has one end securing on the body 342 of the resisting portion 34, and an opposite end securing on the restricting wall 24 of the cover 20.

As shown in FIG. 6, the monitor is in a locked position, and the cover 20 is engaged with the base 10. The claws 256 of the elastic arms 25 engaging in the supporting portions 14 of the base 10 restricts the backward movement of the cover 20 relative to the base 10. The flexible sheets 259 of the elastic arms 25 abutting the cover 20 can further push the engaging ends 254 down to the base 10 and insure the engagement of the claws 256 and the supporting portions 14. Additionally, the barbs 22 of the cover 20 embedded in the supporting recesses 12 of the base 10 can restrict the forward and upward movement of the cover 20 relative to the base 10. Thus, the cover 20 is restricted to move only in desired directions and secured on the base 10.

Referring to FIG. 7, when the cover 20 is to be removed from the base 10, the operation portions 36 of the locking members 30 are manipulated to move towards the restricting walls 24 along the direction shown by the arrow on the operation portions 36, until the first toothed portions 258 of the elastic arms 25 are pushed upwardly by the second toothed portions 348 of the resisting portions 34 and the claws 256 of the elastic arms 25 are disengaged from the supporting portions 14 of the base 10; then, the cover 20 can be moved horizontally and backwardly along the direction of the arrow shown in FIG. 7. After the barbs 22 of the cover 20 are disengaged from the supporting recesses 12 of the base 10, the disengagement of the cover 20 and the base 10 is completed. The engagement of the cover 20 and the base 10 and the disengagement of the cover 20 and the base 10 are in reverse, therefore a detail description thereof is omitted. It is noted that, there is no need to handle the operation portions 36 in the process of the engagement of the cover 20 and the base 10, since the second toothed portions 348 are disengaged from the first toothed portions 258 temporarily before the claws 256 engaging in the supporting portions 14.

It is to be understood, however, that even though numerous characteristics and advantages of the present embodiments have been set forth in the foregoing description, together with details of the configurations and functions of the embodiments, the disclosure is illustrative only, and changes may be made in detail, especially in matters of shape, size, and arrangement of parts within the principles of the embodiments to the full extent indicated by the broad general meaning of the terms in which the appended claims are expressed.

The invention claimed is:

1. A locking device for an enclosure having a base and a cover adapted to be mounted on the base, the locking device comprising:
 a plurality of supporting recesses and a pair of supporting portions defined in the base;
 a plurality of barbs defining on the cover being received in corresponding supporting recesses when the cover is placed over the base and being engaged to the corresponding supporting recesses when the cover is slidably moved along the base;
 a pair of elastic arms assembled on the cover for engaging with the supporting portions when the cover is slidably moved along the base, whereby the cover is restricted to move relative to the base; and
 a pair of locking members assembled on the cover, each locking member comprising a resisting portion abutting a corresponding elastic arm, wherein each elastic arm comprises a first toothed portion, the resisting portion comprises a second toothed portion engaging with the first toothed portion, and the second toothed portions of the resisting portions can be operated to push the first toothed portions of the elastic arms, thereby making the elastic arms disengage from the supporting portions, allowing the cover to slidably move along the base to remove the cover from the base.

2. The locking device of claim 1, wherein each elastic arm further comprises a fixed end fixed to the cover, and an engaging end extending from the fixed end and suspended over the cover and engaging in a corresponding supporting portion of the base.

3. The locking device of claim 2, wherein each elastic arm further comprises a flexible sheet extending from the engaging end and abutting the cover.

4. The locking device of claim 2, wherein a claw extends from the engaging end towards the base and engages in the corresponding supporting portion.

5. The locking device of claim 2, wherein the first toothed portion extends from a distal end of the engaging end for engaging with the second toothed portion.

6. The locking device of claim 1, wherein the resisting portion is mounted on a bottom of the cover, and each locking member further comprises an operation portion mounted on a top of the cover and extending through the cover to connect to the resisting portion, and a flexible member abutting between the resisting portion and the cover.

7. The locking device of claim 6, wherein the resisting portion comprises a body with a securing opening defined therein, and the operation portion comprises a handle and two hooks extending from the handle, the hooks extending through the cover and engaging in the securing opening of the resisting portion.

8. The locking device of claim 7, wherein the resisting portion further comprises a connecting bar extending from a lateral side of the body, and a restricting wall is formed at the bottom of the cover with a hole defined therein for the connecting bar to extend through, the flexible member abutting between the body and the restricting wall.

9. The locking device of claim 7, wherein the second toothed portion extends from an end of the resisting portion, and the first toothed portion extends from the elastic arm for engaging with the second toothed portion.

10. A locking enclosure, comprising:
 a base with a plurality of supporting recesses defined therein and a pair of supporting portions formed thereon;
 a cover adapted to be mounted on the base, the cover comprising a plurality of barbs being received in corresponding supporting recesses when the cover is placed over the base and being engaged to the corresponding supporting recesses when the cover is slidably moved along the base, and a pair of elastic arms assembled on a bottom of the cover for engaging with the supporting portions when the cover is slidably moved along the base, whereby the cover is restricted to move relative to the base; and
 a pair of locking members each comprising a resisting portion assembled to the bottom of the cover and abutting a corresponding elastic arm, and an operation portion mounted on a top of the cover and extending through the cover for connecting to the resisting portion;
 wherein each elastic arm comprises a first toothed portion, the resisting portion comprises a second toothed portion engaging with the first toothed portion, and the second toothed portion of the resisting portion can push the first toothed portion of the elastic arm to disengage the elastic arm from the supporting portion by manipulating the operation portion, allowing the cover to slidably move along the base to remove the cover from the base.

11. The locking enclosure of claim 10, wherein the first toothed portion extends from an end of the elastic arm for engaging with the second toothed portion.

12. The locking enclosure of claim 11, wherein the elastic arm comprises a fixed end fixed on the bottom of the cover, and an engaging end extending from the fixed end and suspended over the cover and engaging in the supporting portion of the base, and the second toothed portion extends from a distal end of the engaging end.

13. The locking enclosure of claim 12, wherein a baffle extends upwardly from the base corresponding to the position of each locking member, the supporting portion comprises a slot defined in the baffle, and a claw extends from the engaging end towards the base and engages in the slot.

14. The locking enclosure of claim 12, wherein the elastic arm further comprises a flexible sheet extending from the engaging end and abutting the bottom of the cover.

15. The locking enclosure of claim 10, wherein the locking member further comprises a flexible member abutting between the resisting portion and the cover.

16. The locking enclosure of claim 15, wherein the resisting portion further comprises a body with a securing opening defined therein, and the operation portion comprises a handle and two hooks extending from the handle, the hooks extending through the cover and engaging in the securing opening of the resisting portion.

17. The locking enclosure of claim 16, wherein a concave portion is defined in the cover for receiving the handle, and a notch is defined in the concave portion for the hooks of the operation portion to extend through.

* * * * *